United States Patent [19]
Tanaka

[11] Patent Number: 5,459,703
[45] Date of Patent: Oct. 17, 1995

[54] DISC PLAYER HAVING A SLIDER TO MOVE A DISC BETWEEN A DISC REPRODUCING POSITION AND A DISC HOLDER

[75] Inventor: Shinsaku Tanaka, Tokyo, Japan

[73] Assignee: Tanashin Denki Co., Ltd., Tokyo, Japan

[21] Appl. No.: 49,493

[22] Filed: Apr. 21, 1993

[30] Foreign Application Priority Data

Apr. 24, 1992 [JP] Japan .................................. 4-131993

[51] Int. Cl.⁶ .......................... G11B 15/00; G11B 17/22
[52] U.S. Cl. .......................... 369/36; 369/191; 369/77.1
[58] Field of Search .................................. 369/34, 36, 38, 369/39, 75.2, 77.1, 77.2, 191, 192, 178; 360/92, 98.04

[56] References Cited

U.S. PATENT DOCUMENTS

| | | | |
|---|---|---|---|
| 4,439,852 | 3/1984 | Hughes | 369/77.2 |
| 4,594,700 | 6/1986 | Takahashi et al. | 369/39 |
| 4,654,840 | 3/1987 | Takahashi | 369/75.2 |
| 4,691,309 | 9/1987 | Suzuki | 369/38 |
| 4,701,899 | 10/1987 | d'Arc | 369/36 |
| 4,737,965 | 4/1988 | Yamazaki et al. | 369/36 |
| 4,797,865 | 1/1989 | Imai et al. | 369/36 |
| 4,878,137 | 10/1989 | Yamashita et al. | 360/98.05 |
| 4,949,324 | 8/1990 | Arata | 369/36 |
| 4,949,328 | 8/1990 | Kase et al. | 369/75.2 |
| 5,025,338 | 6/1991 | Sone et al. | 360/92 |
| 5,034,937 | 7/1991 | Caspers et al. | 369/34 |
| 5,050,147 | 9/1991 | Grobben et al. | 396/34 |
| 5,123,001 | 6/1992 | Nakamichi et al. | 369/36 |
| 5,140,579 | 8/1992 | Suzuki et al. | 369/77.1 |
| 5,177,722 | 1/1993 | Nakamichi et al. | 369/36 |
| 5,210,728 | 5/1993 | Noguchi et al. | 369/36 |
| 5,274,620 | 12/1993 | Sipos | 369/36 |

FOREIGN PATENT DOCUMENTS

| | | |
|---|---|---|
| 0225766 | 6/1987 | European Pat. Off. . |
| 0355011 | 2/1990 | European Pat. Off. . |
| 0358780 | 3/1990 | European Pat. Off. . |
| 0392489 | 10/1990 | European Pat. Off. . |
| 0516496 | 12/1992 | European Pat. Off. . |
| 3519617 | 12/1985 | Germany . |
| 3923107 | 1/1991 | Germany . |
| 4105016 | 8/1992 | Germany . |
| 63-204547 | 8/1988 | Japan . |
| 0204548 | 8/1988 | Japan .................................. 369/191 |
| 1151057 | 6/1989 | Japan . |
| 438659 | 2/1992 | Japan . |
| 2258338 | 2/1993 | United Kingdom . |
| 8803694 | 5/1988 | WIPO . |

Primary Examiner—Stuart S. Levy
Assistant Examiner—Brian E. Miller
Attorney, Agent, or Firm—Evenson, McKeown, Edwards & Lenahan

[57] ABSTRACT

A disc player has a disc receiver for supporting a disc thereon and a disc holder for directly holding a plurality of discs one over another at different heights with vertical intervals left therebetween without the need for movable disc trays or the like. The receiver is arranged in a disc reproducing position whereas the holder is disposed movably up and down adjacent to the disc reproducing position. A disc guide is also provided for linearly guiding desired one of the discs between the disc reproducing position and the corresponding height in the holder with the desired disc maintained at an outer periphery thereof in contact with the guide. The disc player is also provided with a disc transportation mechanism for pushing the desired disc at an outer peripheral portion thereof, said portion being located on a side opposite to the guide relative to a center of the desired disc, in a direction parallel to the guide, whereby the desired disc is transported between the corresponding height in the holder and the receiver.

6 Claims, 9 Drawing Sheets

DISC PLAYER HAVING A SLIDER TO MOVE A DISC BETWEEN A DISC REPRODUCING POSITION AND A DISC HOLDER

BACKGROUND OF THE INVENTION

1. Field of the Invention

This invention relates to a disc player which permits simultaneous loading of plural discs as recording media therein and has been reduced in dimensions.

2. Description of the Related Art

Disc players are used to perform optical reading and digital reproduction of information recorded on a disc as a recording medium. These disc players have spread widely in recent years. In particular, the spreading of disc players for the reproduction of information, such as music, recorded on so-called CDs (compact discs) of 12 cm or 8 cm in diameter is remarkable.

Disc players of the type described above can be classified into two groups, one being of the type that discs are loaded one after another for reproduction and the other of the type equipped with a so-called autochanger function so that plural discs held in a magazine are drawn out one by one for reproduction.

In a conventional disc player equipped with such an autochanger function, plural disc trays each of which carries a disc mounted thereon are generally held in a magazine. The magazine is detachable from a main body of the disc player. After insertion of the magazine in the main body of the disc player, one of the disc trays is drawn out of the magazine and then transported to a disc reproducing position, whereby information of the disc mounted on the disc tray is reproduced. To reproduce information of all the discs, the above procedure is repeated.

To selectively draw out one of the disc trays from the magazine and then to reproduce the information of the disc mounted on the disc tray, it is possible to move a reproduction unit—which is provided, for example, with a turntable mechanism and an optical head system —upwardly or downwardly in accordance with the height of the disc tray to be drawn out of the magazine. However, the reproduction unit is relatively heavy and is required to have a high degree of accuracy in movement. To permit stable and smooth, upward or downward movement of the reproduction unit over a particular distance which varies depending on the height of each disc tray to be drawn out, a considerably complex and highly accurate mechanism is indispensable.

As an alternative, it may be contemplated of moving the magazine upwardly or downwardly to bring a desired disc tray into alignment in height with the reproduction unit instead of moving the reproduction unit downwardly or upwardly. The magazine is however designed to permit its detachment from the main body of the disc player. To support the magazine movably up and down, a support mechanism for the magazine in the main body of the disc players inconveniently becomes complex and large.

With the foregoing in view, some conventional disc players have adopted such a construction that a magazine is mounted simply in a detachable manner on a main body and, after a disc tray is transported from the magazine to a point above a reproducing position, the disc tray so transported is lowered to the height of the reproducing position, for example, by a lift mechanism. This construction, however, additionally requires the lift mechanism, resulting in the problem that the overall construction becomes greater and, especially, the vertical dimension increases.

In the conventional disc players of the construction described above, it is necessary to detach the magazine from the main body and then to draw out the disc trays of the magazine when a user wants to mount discs on the disc trays and keep them in the magazine or to replace the discs in the magazine by different discs. This has led to the inconvenience that disc replacement work is very cumbersome.

As has been described above, the conventional disc players are accompanied by a problem such that the construction a transportation mechanism for transporting each disc between the magazine and the disc reproducing portion is complex. Any attempt to reduce the vertical dimension results in the problem that the number of discs which can be stored has to be decreased.

SUMMARY OF THE INVENTION

The present invention has been completed with the foregoing circumstances in view. An object of the present invention is therefore to provide a disc player which permits simultaneous loading of many discs despite its relatively compact size and simplification of a disc selecting mechanism.

In one aspect of the present invention, there is hence provided a disc player comprising:

a disc receiver for supporting a disc mounted thereon, said disc receiver being arranged in a disc reproducing position;

a disc holder for directly holding a plurality of discs themselves one over another at different heights with a predetermined vertical interval left therebetween, said disc holder being disposed movably up and down adjacent to said disc reproducing position;

a disc guide for linearly guiding desired one of said discs between said disc reproducing position and the corresponding height in said disc holder with said desired disc maintained at an outer periphery thereof in contact with said disc guide; and a disc transportation mechanism for pushing said desired disc at an outer peripheral portion thereof, said portion being located on a side opposite to said disc guide relative to a center of said desired disc, in a direction parallel to said disc guide, whereby said desired disc is transported between the corresponding height in said disc holder and said disc receiver.

The term "themselves" as used herein means that the discs can be directly held and stored in the disc holder without the need for movable disc trays or the like.

According to the disc player constructed as described above, plural discs are held at predetermined vertical intervals in the disc holder. By moving the disc holder upwardly or downwardly, the desired disc whose information is to be reproduced is positioned at a predetermined height. The desired disc is directly pushed at the outer periphery thereof by the disc transportation mechanism, whereby the desired disc can be transported to the disc reproducing position while being maintained at the outer periphery thereof in contact with the disc guide.

Further, the disc mounted on the disc receiver is pushed directly at the outer periphery thereof by the disc transportation mechanism, whereby the disc is returned while being maintained at the outer periphery thereof in contact the disc guide and is then stored at the corresponding height in the disc holder.

According to the present invention, the disc holder directly holds therein plural discs as discrete discs at predetermined vertical intervals and selection of desired one of the discs is performed by moving the upwardly or downwardly at least one of the disc holder and the disc reproducing means. This has made it possible to set the distance of each movement of a reproduction unit at a fixed value.

The transportation of the desired disc between the corresponding height in the disc holder and the disc reproducing means is performed easily by the disc guide, said disc guide being capable of contacting the outer periphery of the disc to define a track for the disc, and the disc transportation mechanism which pushes the disc at the outer periphery thereof to cause the disc to move along the disc guide.

In addition, it is no longer necessary to detach the disc holder from a main body of the disc player.

This has made it possible to simplify a mechanism for supporting the disc holder in a vertically movable manner. Moreover, the elimination of disc trays has made it possible to load many discs at once in the relatively small and light-weight disc holder and to easily reproduce information of the. individual discs from one disc to another.

BRIEF DESCRIPTION OF THE DRAWINGS

The above and other objects, features and advantages of the present invention will become apparent from the following description and the appended claims, taken in conjunction with the appended drawings, in which:

DETAILED DESCRIPTION OF THE INVENTION AND PREFERRED EMBODIMENT

According to the present invention, plural discs are directly held in the disc holder without disc trays or the like and a desired one of the discs is transported from the disc holder to a disc reproducing position to perform reproduction of its information. Replacement of the disc can be performed either at the disc reproducing position or at a disc replacing position arranged separately from the disc holding position and the disc reproducing position. One embodiment of the present invention will hereinafter be described, in which the disc replacing position is separately arranged in addition to the disc holding position and the disc reproducing position.

Figure 1:
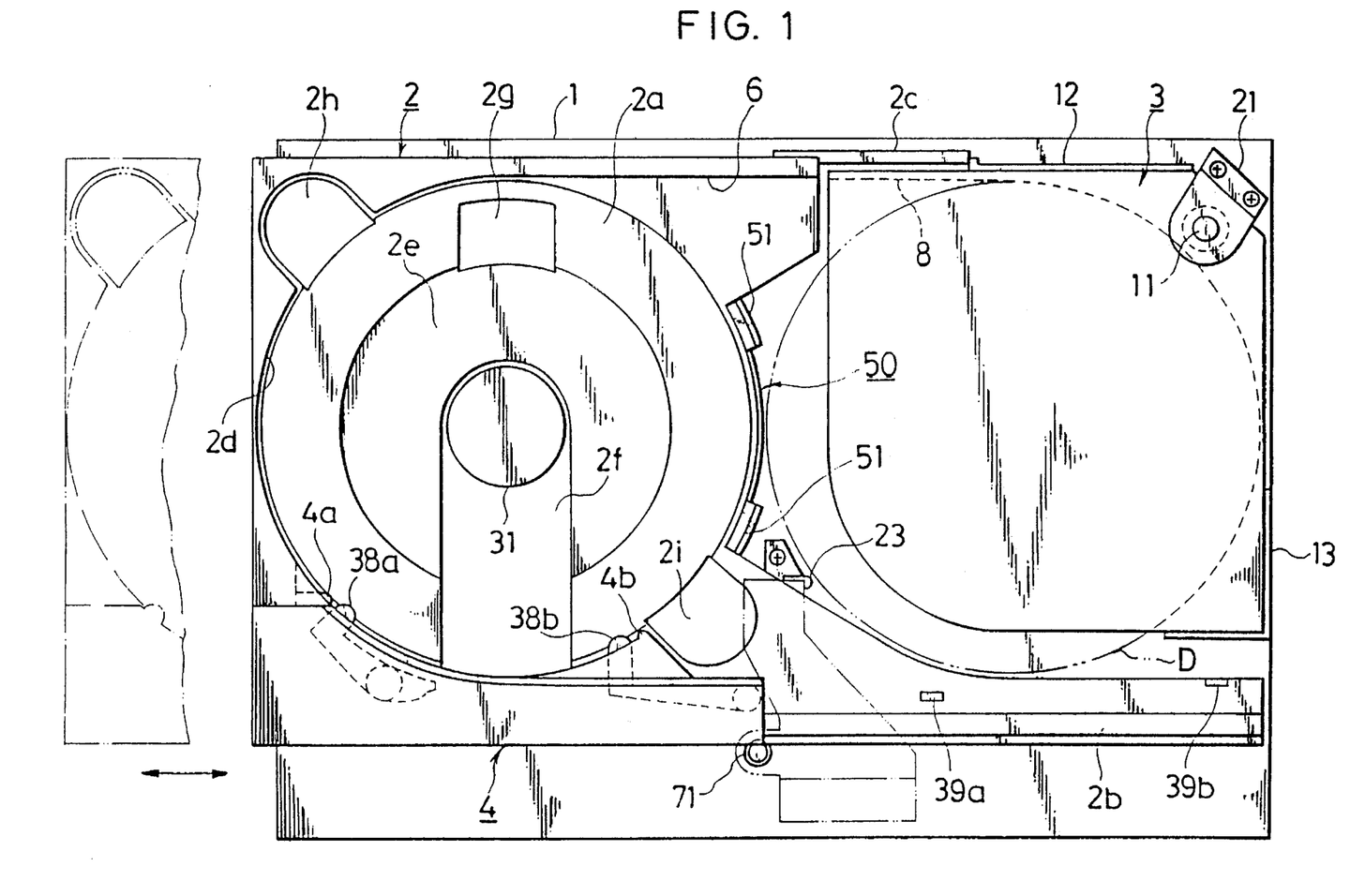
FIG. 1 is a plan view showing the outline construction of a disc player according to one embodiment of the present invention.
Figure 2:
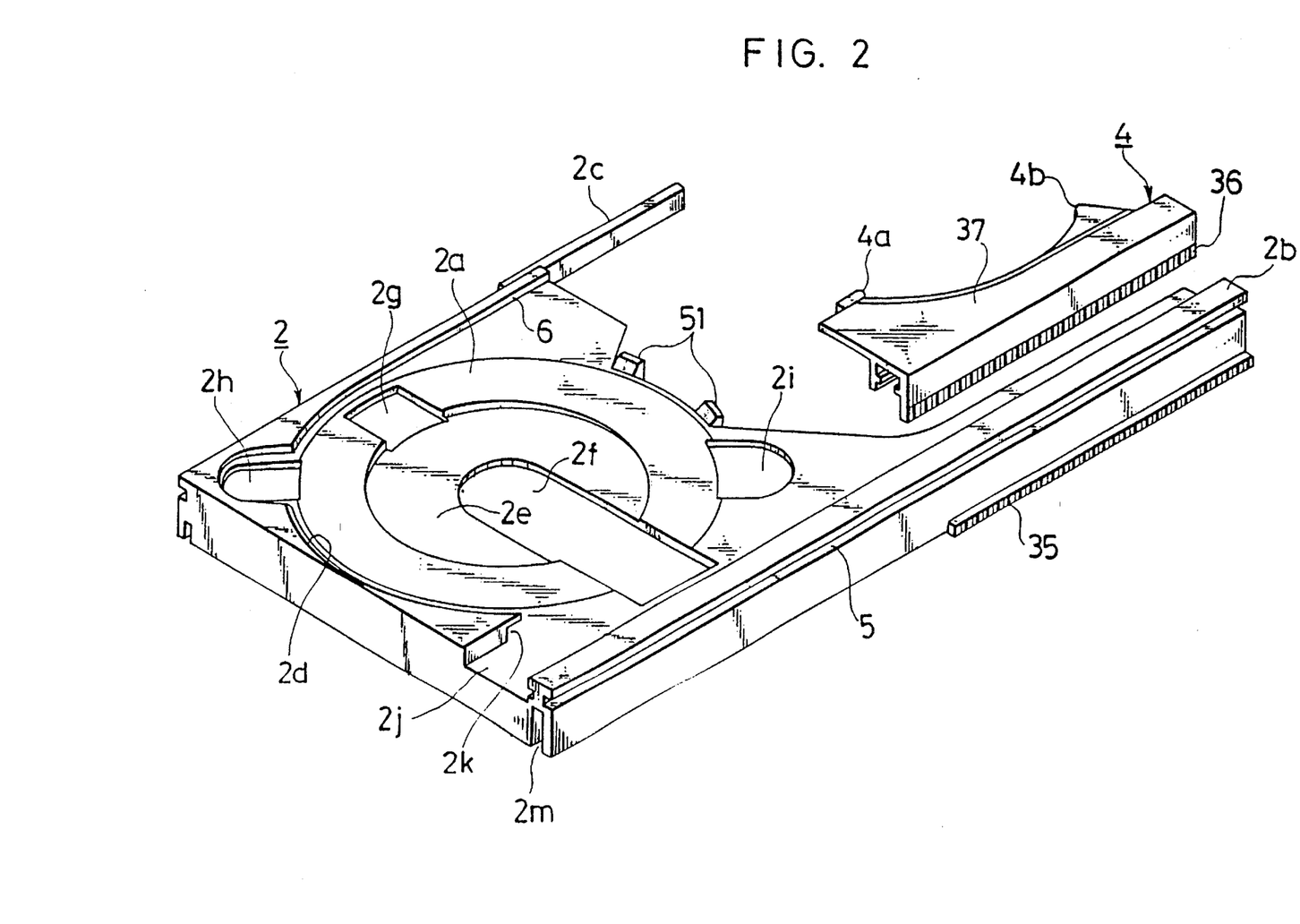
FIG. 2 is a perspective view illustrating the outline construction of a disc receiver and a slider.

Referring first to FIG. 1, numeral 1 indicates a main chassis. On an upper side of the main chassis 1, a disc receiver 2 for holding a disc D at a predetermined position in a disc reproducing position is mounted movably between the disc reproducing position and a predetermined, pulled-out position indicated by a two-dot chain line in the drawing. As illustrated in FIG. 2, the disc receiver 2 has been formed by uniting into an integral structure a mount 2a, on which the disc D is mounted, and two arm portions 2b,2c permitting movable arrangement of the mount 2a relative to the main chassis 1.

At a rear position of the main chassis 1, said rear position being adjacent to the disc reproducing position, that is, being on a side opposite to a side on which the disc receiver 2 is pulled out, a disc holder 3 is mounted movably up and down. As depicted in FIG. 3(b), the disc holder serves to hold plural discs D at predetermined vertical intervals at a like plural number of heights without disc trays.

Mounted on the arm portion 2b of the disc receiver 2 is, as shown in FIG. 2, a slider 4 which serves as a disc transportation mechanism for the transportation of the disc D between the disc reproducing position and the disc holder 3. The disc receiver 2 is provided with guide grooves 5 which are formed over the entire length of the arm portion 2b in inner and outer walls of an upper part of the arm portion 2b, respectively. The slider 4 is movably fitted in the guide grooves 5. The slider 4 is provided with an unloading tab 4a for pushing each 12-cm disc D at an outer periphery thereof from a side of the disc reproducing position toward a side of the disc holder 3 and also with a loading tab 4b for conversely pushing the disc D from the side of the disc holder 3 toward the side of the disc reproducing position.

Formed, on the other hand, on an upper wall of the disc receiver 2 is, as shown in FIG. 2, a disc-receiver-side guide 6 which is located on a side opposite to the position where the slider 4 is mounted. During transportation of the 12-cm disc D, the outer periphery of the disc D is maintained in contact with the disc-receiver-side guide 6. Within the disc holder 3, plural racks 7 having a width smaller than the diameter of the 12-cm disc D are integrally formed at predetermined vertical intervals in a mutually parallel relationship so that a 12-cm disc D can be mounted on each rack 7. Inner walls between the adjacent racks 7 and between a top plate and the uppermost rack 7 are formed as a holder-side guide 8. A continuous, linear disc guide is formed of the holder-side guide 8 and the disc-receiver-side guide 6.

When the 12-cm disc D is pushed at the outer periphery thereof by the unloading tab 4a or the loading tab 4b of the slider 4 in the corresponding direction in parallel with the disc guides 6,8, the disc D is linearly transported between the mount 2a of the disc receiver 2 and the rack 7 at the prescribed height in the disc holder 3 while being maintained at the outer periphery in contact with the disc guides 6,8.

The disc holder 3 has such a shape that on a side opposite to the disc reproducing position and also on a side opposite to the slider 4, it is closed by an arcuate wall conforming in shape with the contour of each 12-cm disc D and the linear, holder-side guide 8, respectively, is open over an entire face thereof on the side of the disc reproducing position, and on the side of the slider 4, is open from a point, the point being opposite to the disc reproducing position relative to a line L which extends through centers of the stored discs D at a right angle with respect to the disc guide 8, to the side of the disc reproducing position.

Figure 3A:
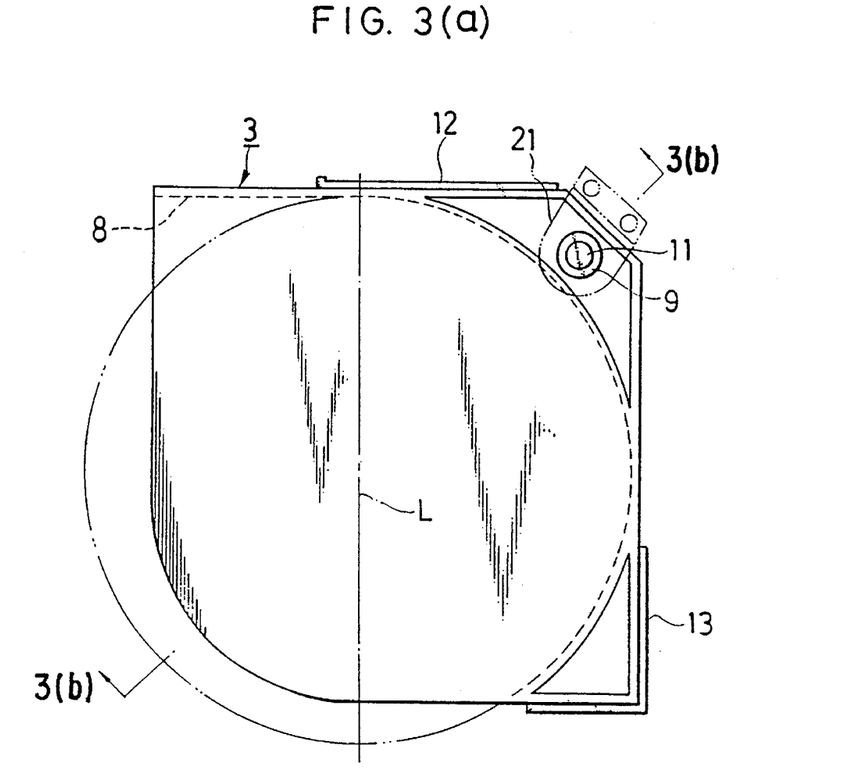
FIGS. 3(a), 3(b) and 3(c) schematically illustrate the outline construction of a disc holder and a lift mechanism therefor.
Figure 3B:
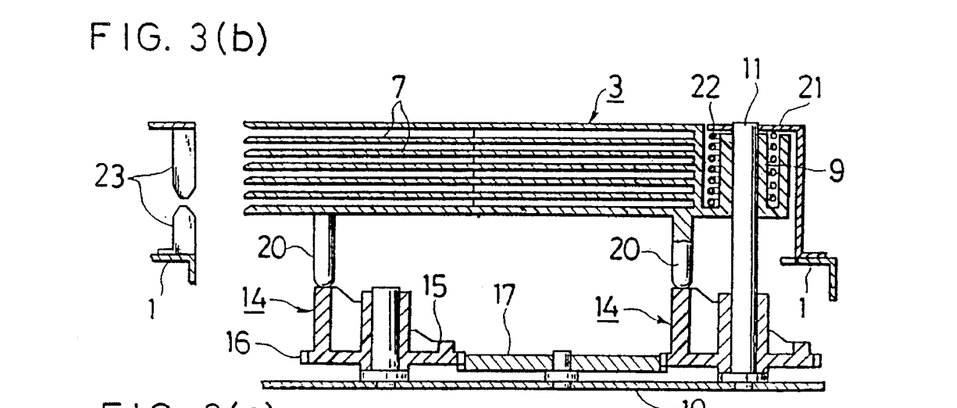

Accordingly, each 12-cm disc D is mounted on its corresponding rack 7 in such a way that, as illustrated by a two-dot line in FIG. 3(a), the 12-cm disc D extends out from the disc holder 3 along an edge portion of the disc holder 3 on the side of the disc reproducing position and also along an edge portion of the disc holder 3 on the side of the slider 4.

A bearing 9 is integrally formed in a corner of the disc holder 3, which corner is located outside the arcuate wall.

As is illustrated in FIG. 3(b), on the other hand, a shaft 11 is disposed upright on a sub-chassis 10 which is arranged below the main chassis 1 at a predetermined distance from the main chassis 1. The shaft 11 extends through the bearing 9 so that the disc holder 3 is supported movably up and down. The disc holder 3 is prevented from turning by guide plates 2,13 arranged upright on the main chassis 1 as depicted in FIG. 3(a).

Figure 4:
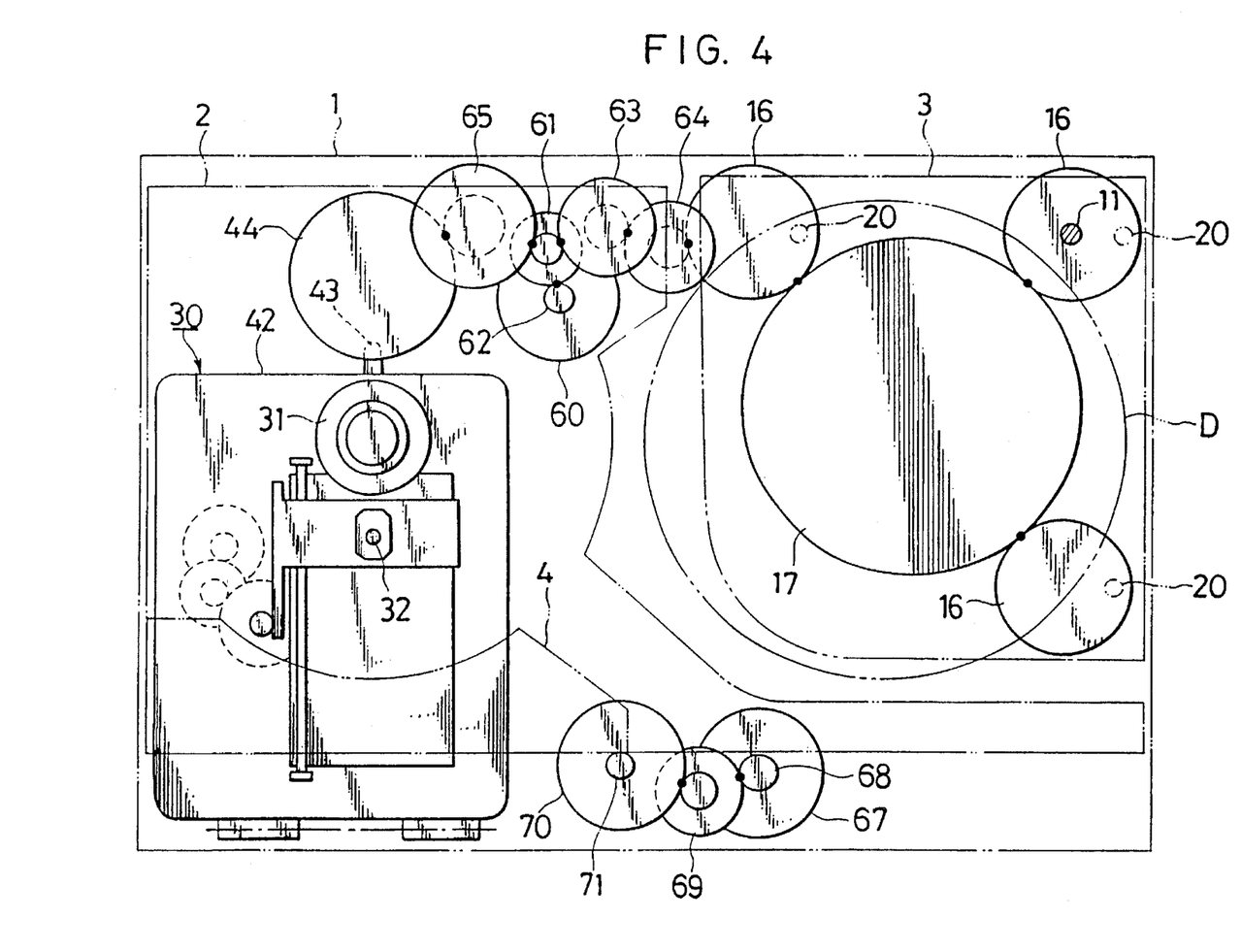
FIG. 4 is a schematic illustration of a drive system in the disc player.

On an upper side of the sub-chassis 10, three rotating cams 14 are rotatably supported at positions underneath the disc holder 3 as illustrated in FIGS. 3(b) and 4. One of the rotating cams 14 is rotatably supported on the shaft 11.

Figure 3C:
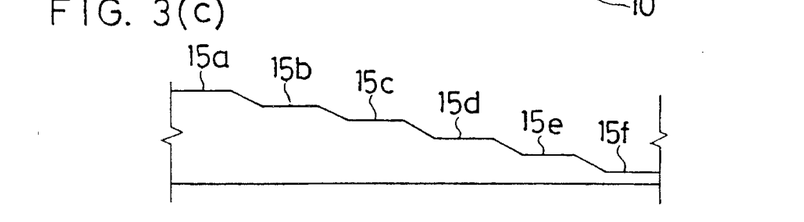

The three rotating cams 14 have the same configuration and, as is illustrated in a developed form in FIG. 3(c), are each provided with a stepped cam 15 having plural holder-receiving surfaces 15a–15f arranged successively in a circumferential direction. Each rotating cam 14 is also provided at an outer lower periphery thereof with a rim gear 16. In FIG. 4, these rim gears 16 and other gears, which are to be described subsequently herein, are all indicated merely by circles for the sake of simplification, and the points of their meshing engagements are indicated by dots. The difference in height between the adjacent holder-receiving surfaces 15a–15f is set equal to the vertical interval of the individual racks 7 of the disc holder 3. The rim gears 16 of the three rotating cams 14 are maintained in meshing engagement with a rotation transmitting gear 17 rotatably supported as an interlocking rotating member on the sub-chassis 10.

From a bottom wall of the disc holder 3, on the other hand, three cam contacting portions 20 extend corresponding to the stepped cams 15 of the respective rotating cams 14.

An upper end portion of the shaft 11 is, as shown in FIG. 3(b), supported by a bracket 21 secured on the main chassis 1. A coiled compression spring 22 is wound on and around an outer peripheral wall of the bearing 9. The spring 22 is interposed in a compressed pressed state between the bracket 21 and the disc holder 3. The disc holder 3 is normally biased downwardly by the coiled compression spring 22 in addition to its own weight, so that each cam contacting portion 20 is pressed against one of the holder-receiving surfaces 15a–15f of the associated rotating cam 14. Accordingly, the height of the disc holder 3 successively varies by a constant degree under the action of the respective stepped cam 15 as the three rotating cams 14 rotate in unison.

Designated at numeral 23 in FIGS. 1 and 3(b) is a stopper plate for preventing discs D from slipping out of the disc holder 3. The stopper plate 23 is formed of two members arranged in an up-and-down relationship with a clearance left therebetween, and is disposed at a position diametrically opposite to the shaft 11 across the discs D stored in the disc holder 3. When the disc holder 3 assumes a highest position, the 12-cm disc D stored on the lowest rack 7 is positioned at the same height as the clearance between the upper and lower members of the stopper plate 23. When the disc holder 3 assumes a lowest position, on the other hand, the 12-cm disc D stored on the highest rack 7 is positioned at the same height as the clearance.

When the slider 4 is located on the side of the disc holder 3, the unloading tab 4a is positioned in the clearance between the upper and lower members of the stopper plate 23 so that the unloading tab 4a prevents the 12-cm disc D from slipping out through the clearance.

On the other hand, the mount 2a of the disc receiver 2 is provided, as illustrated in FIG. 2, with an arcuate peripheral wall 2d in continuation with the disc-receiver-side guide 6 so that the arcuate peripheral wall 2d surrounds about one third of the outer periphery of the 12-cm disc fed out from the side of the disc holder 3.

Inside the peripheral wall 2d, a circular cavity 2e for mounting an 8-cm disc therein is formed one step deeper than the peripheral wall 2d and concentrically with the peripheral wall 2d. An elongated opening 2f is formed from a central part of the circular cavity 2e toward the side of the arm portion 2b at a right angle relative to the arm portion 2b. This elongated opening 2f is formed so that, as depicted in FIG. 4, a turntable 31 of a reproduction unit 30 can extend through the elongated opening 2f to permit movement of the optical head 32 parallel with the information recorded side of the disc in a radial direction of the disc and an optical head 32 of the reproduction unit 30 can be disposed facing a lower side of the disc D to permit movement of the optical head 32 to move in parallel with the information recorded side of the disc. In combination with the disc receiver 2, the reproduction unit 30 constitutes the disc reproducing means. Incidentally, the turntable 31 is partly formed of a magnet.

A rectangular recess 2g is formed in an inner part of the peripheral wall 2d at a position opposite to the elongated opening 2f. By inserting fingers into the rectangular recess 2g and the elongated opening 2f, the 8-cm disc D mounted in the circular cavity 2e can be taken out with ease. The mount 2a is also provided with two rounded recesses 2h,2i which extend in an oblique direction with respect to the elongated opening 2f. By inserting fingers into the rounded recesses 2h,2i, the 12-cm disc D mounted inside the peripheral wall 2d can be taken out with ease.

A cut-off portion 2j is formed between the peripheral wall 2d and the arm portion 2b. This cut-off portion 2j is provided to secure a passage for the slider 4 when it has moved to the side of the mount 2a. At an end portion of the peripheral wall 2d, a recess 2k is also formed in continuation with the cut-off portion 2j. When the slider 4 has moved to the side of the mount 2a, the unloading tab 4a of the slider 4 is received in the recess 2k.

Incidentally, the length of the arm portion 2b is designed about twice as long as the rearward length of the mount 2a as shown in FIG. 2. A slot 2m is formed longitudinally in a lower wall of the arm portion 2b and is fitted on a guide member (not shown) provided upright on the main chassis 1, whereby the mount 2a is movable linearly. On a lower part of an outer side of the arm portion 2b, rack teeth 35 are integrally formed extending from an approximately central portion to an end portion on the side of the disk holder 3.

The disc receiver 2 is also movable from the disc reproducing position in a direction opposite to the disk holder 3.

Figure 5A:
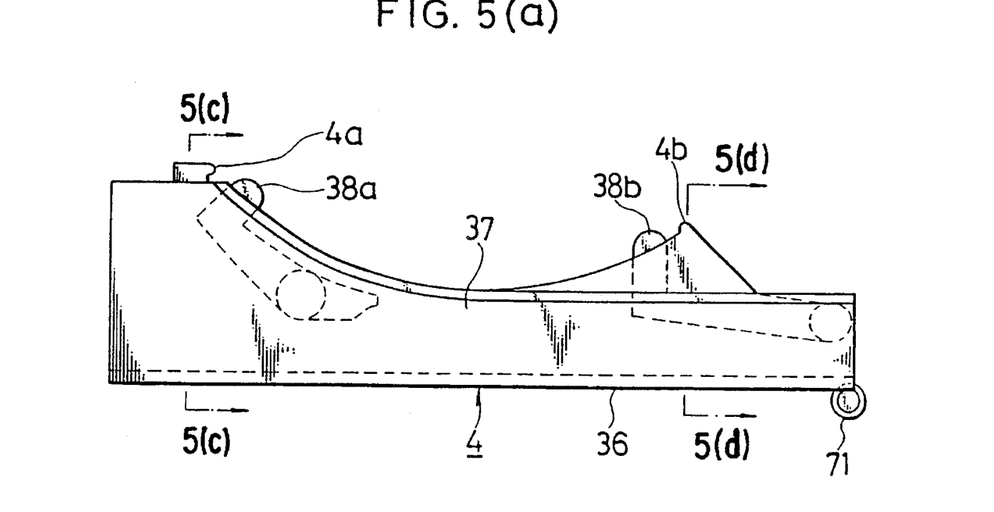
FIGS. 5(a) through 5(d) schematically depict the construction of the slider.
Figure 5B:
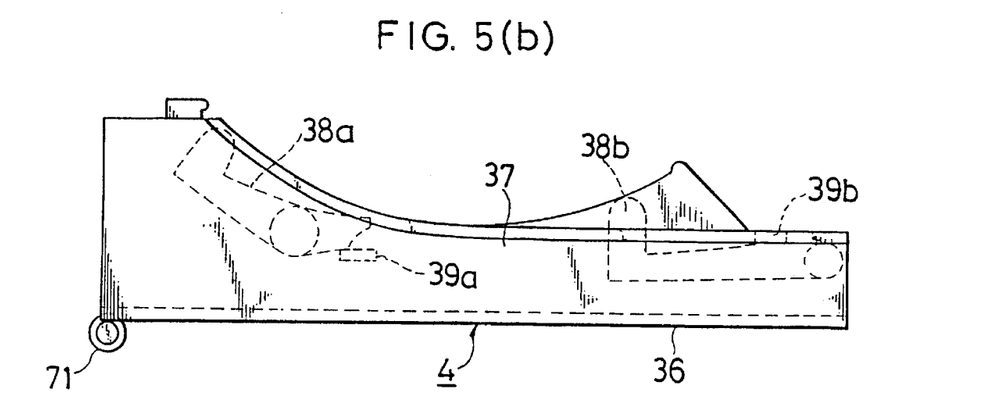
Figure 5C:
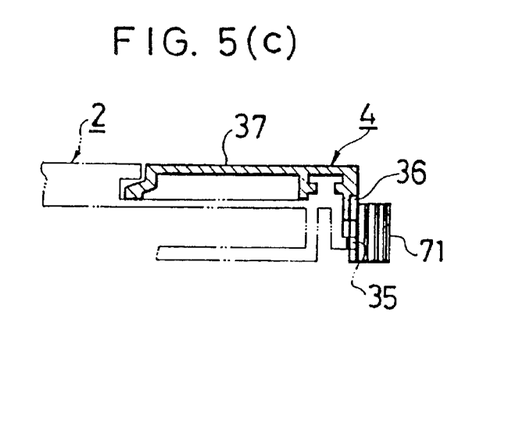
Figure 5D:
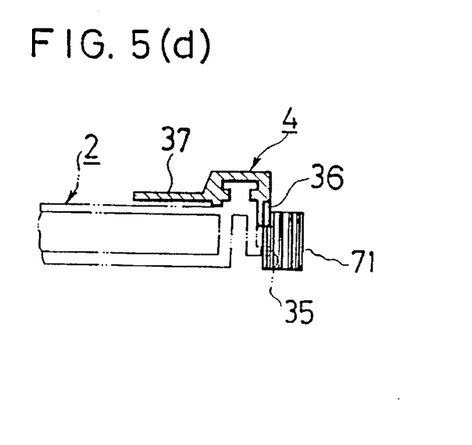

As are illustrated in FIG. 2, additional rack teeth 36 are formed on a lower part of an outer side of the slider 4. A top plate 37 of the slider 4 extends toward the guide 6 or 8. As is depicted in FIGS. 2, 5(a) and 5(b), an inner edge portion of the top plate 37 has a curved concave shape which extends along the outer periphery of the 12-cm disc D. The unloading tab 4a and the loading tab 4b are integrally formed at opposite ends of the curved concave edge so that the unloading tab 4a and the loading tab 4b are adapted to push the disc D at the outer periphery thereof.

Pivotally provided on a lower side of the top plate 37 as shown in FIGS. 5(a) and 5(b) are two liftup fingers 38a,38b which are formed like thin knives at free ends thereof, respectively. These liftup fingers 38a,38b are adapted in such a way that their knife-shaped free end portions advance like wedges below the lower side of the 12-cm disc D and then slightly lift the disc D from the upper surface of the corresponding rack 7. The liftup fingers 38a,38b are normally biased and pivoted by unillustrated springs in directions such that their free end portions extend out from the curved concave edge of the top plate 37. When the slider 4 is at its end position on the side of the disc holder 3, the liftup fingers 38a,38b are, as shown in FIG. 5(b), maintained in contact with lugs 39a,39b disposed upright on the arm portion 2b of the disc receiver 2 so that the liftup fingers 38a,38b have been pivoted against the springs to the side of the lower side of the top plate 37 to avoid interference with vertical movement of the disc holder 3.

Figure 7A:
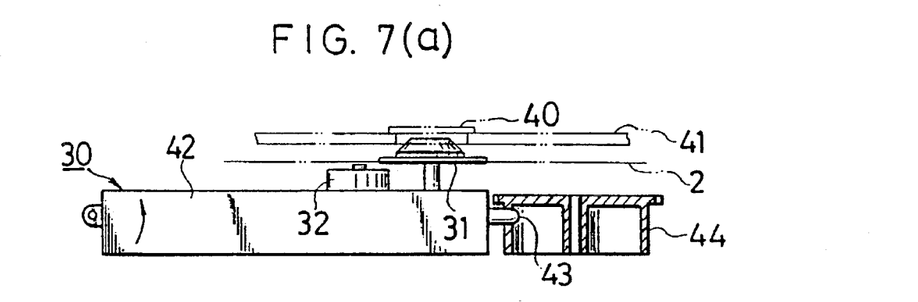
FIGS. 7(a) and 7(b) schematically show a reproduction unit in a raised and lowered positions, respectively.

On the chassis 1, a clamp support 41 for a clamp 40 is also fixed as indicated by two-dot chain lines in FIG. 7(a). The clamp 40 is formed of a magnetic member such as a thin iron plate. Its position is set in such a way that, when the disc receiver 2 is at the disc reproducing position, the clamp 40 is located above the center of the disc D mounted on the mount 2a.

The reproduction unit 30 is arranged on the side of the lower side of the chassis 1. This reproduction unit 30 comprises, as shown in FIG. 4, the optical head 32, the turntable 31, a motor and a rotation transmitting mechanism for driving the turntable 31, etc., which are all mounted on a base 42. The turntable 31 is always located underneath the clamp 40. The base 42 is mounted pivotally up and down at one end thereof on the lower side of the chassis 1.

Figure 7B:
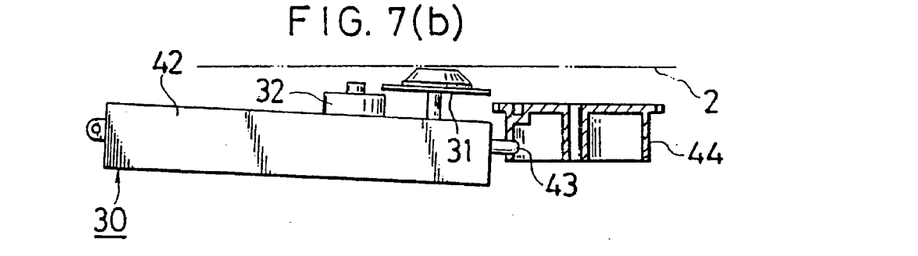

When the base 42 is at a position pivoted downwardly as illustrated in FIG. 7(b), the turntable 31 is located below the lower side of the mount 2a of the disc receiver 2. As the base 42 is pivoted upwardly as illustrated in FIG. 7(a), the turntable 31 ascends through the elongated opening 2f of the mount 2a to a level somewhat higher than the upper side of the mount 2a.

When the disc D is present on the mount 2a in the state shown in FIG. 7(b), the turntable 31 slightly lifts the disc D and also slightly lifts the clamp 40 while the clamp 40 is still magnetically attracted toward the clamp support 41. The turntable 31 holds, in association with the clamp 40, the disc D at a peripheral edge portion around its central hole and then drives and rotates the disc D.

Figure 6:
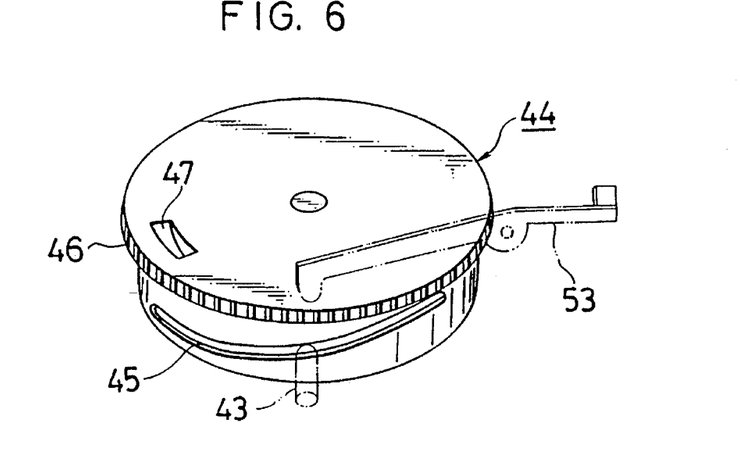
FIG. 6 is a perspective view showing the construction of a unit lift cam.
Figure 8:
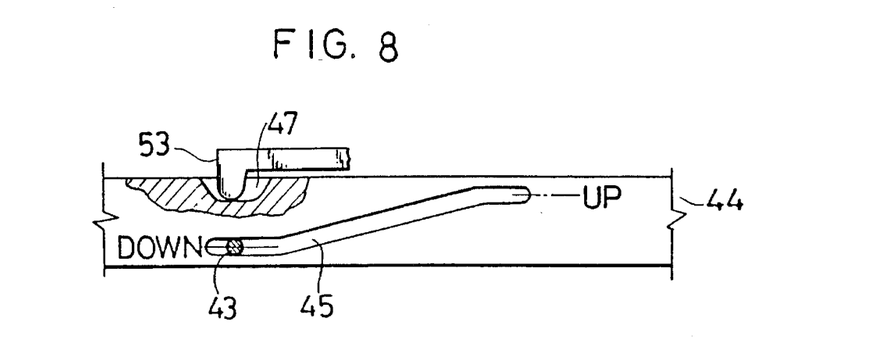
FIG. 8 schematically illustrates a relationship between a unit position control slit and a recess. both formed in the unit lift cam.

The base 42 is provided at a free end thereof with an engagement pin 43 as depicted in FIGS. 7(a) and 7(b). On the lower side of the chassis 1, a unit lifting cam 44 as shown in FIG. 6 is rotatably arranged. The unit lifting cam 44 is in the form of a flattened cylinder equipped with a top plate. Its cylindrical wall portion is provided with a unit position control slit 45 which, as illustrated in a developed form in FIG. 8, comprises an inclined slit and two horizontal slits formed in continuation with and at opposite ends of the inclined slit. The engagement pin 43 is inserted in the slit 45.

As is shown in FIG. 6, a rim gear 46 is formed on an outer periphery of the top plate of the unit lifting cam 44 and a recess 47 is formed in an upper wall of the top plate.

Figure 9:
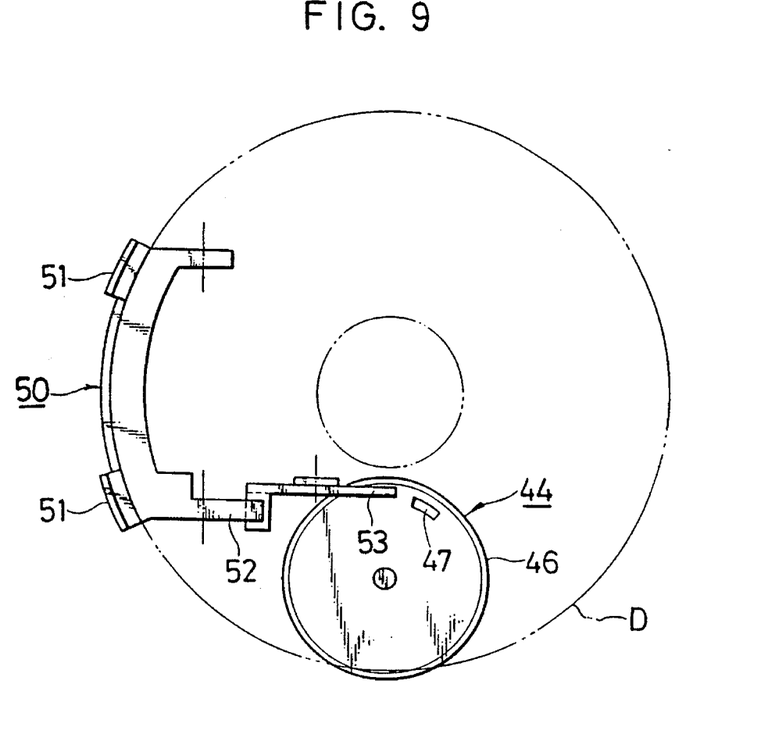
FIG. 9 is a plan view showing the construction of a disc pressing portion relative to a disc.
Figure 10A:
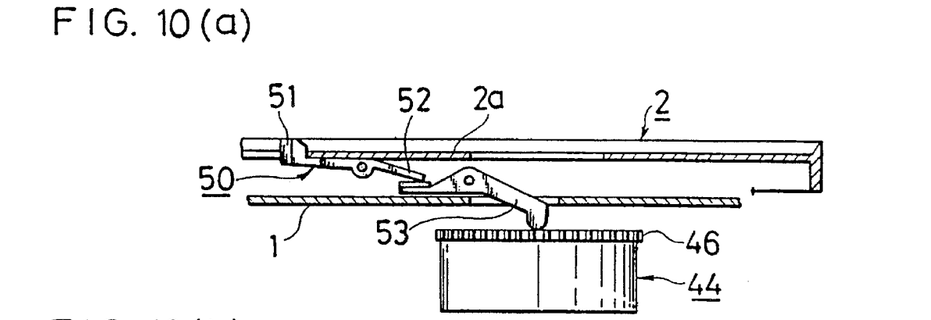
FIGS. 10(a) and 10(b) schematically illustrate action of the disc pressing portion.
Figure 10B:
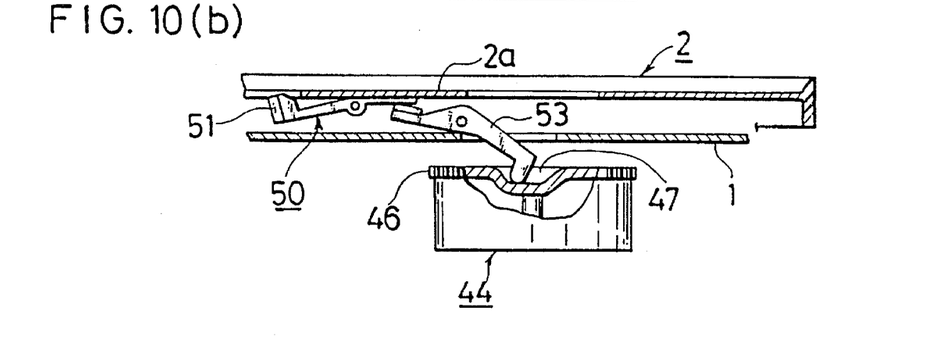

On a rear side of an end portion of the disc receiver 2, the end portion being on the side of the disc holder 3, a positioning member 50 is mounted pivotally up and down as shown in FIGS. 10(a) and 10(b). AS is illustrated in FIG. 9, the positioning member 50 is provided at one end thereof, the one end being on the side of the disc holder 3 relative to a center of its pivotal motion, with a pair of disc pressing portions 51,51 and at an opposite end thereof with an engagement leg 52. By unillustrated spring means, the positioning member 50 is normally biased clockwise as viewed in FIGS. 10(a) and 10(b). An upper half portion of an inner wall of each disc pressing portion 51 is formed as an inclined pressing surface. If the 12-cm disc D is mounted offset toward the disc holder 3 from an appropriate position on the mount 2a, both the inclined pressing surfaces push the disc D at the outer periphery thereof to a point proximal to the appropriate position as the positioning member 50 is caused to pivot by spring means from the position in FIG. 10(b) to the position in FIG. 10(a).

An intermediate lever 53 is pivotally mounted on the upper side of the chassis 1. One end of the lever 53 is located between the engagement leg 52 of the positioning member 50 and the upper side of the chassis 1. An opposite end of the lever 53 extends through an opening, which is formed in the chassis 1, to a point opposite to the top plate of the unit lifting cam 44. By unillustrated spring means, the intermediate lever 53 is also normally biased clockwise as viewed in FIGS. 10(a) and 10(b) so that the opposite end of the intermediate lever 53 is normally pressed against the top plate of the unit lifting cam 44.

Figure 11:
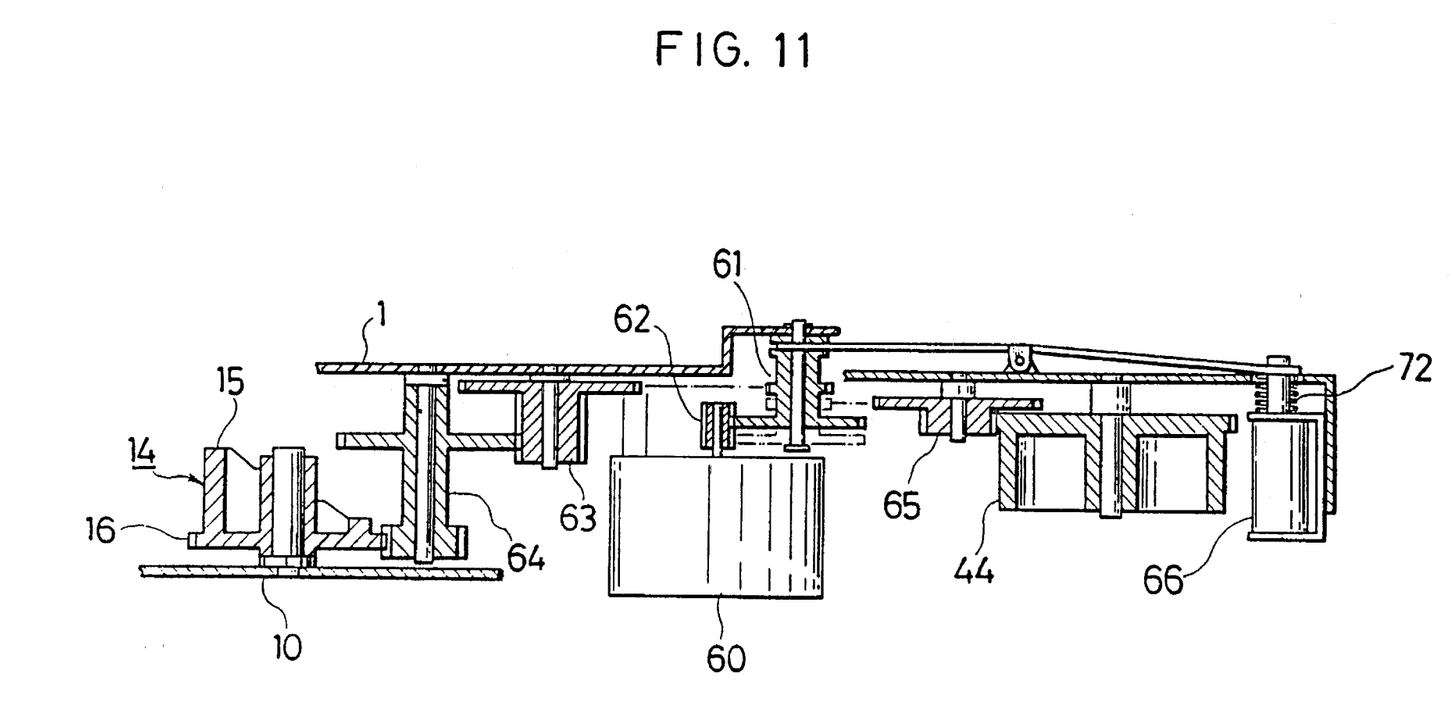
FIG. 11 is a schematic illustration showing the arrangement and construction of the drive system in the disc player.
Figure 12A:
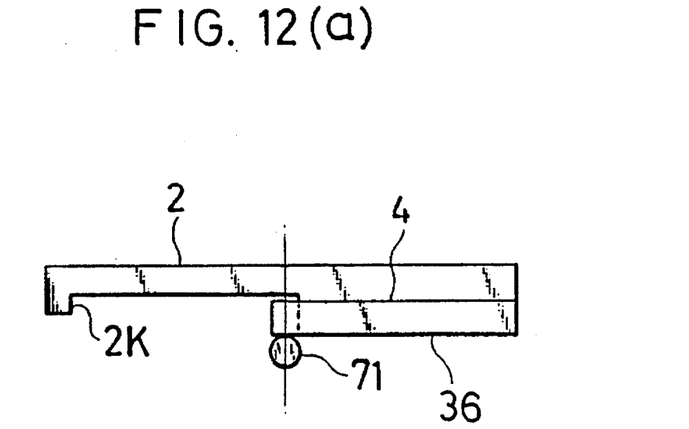
FIGS. 12(a) through 12(d) schematically show relationships among the disc receiver, the slider and a pinion.
Figure 12B:
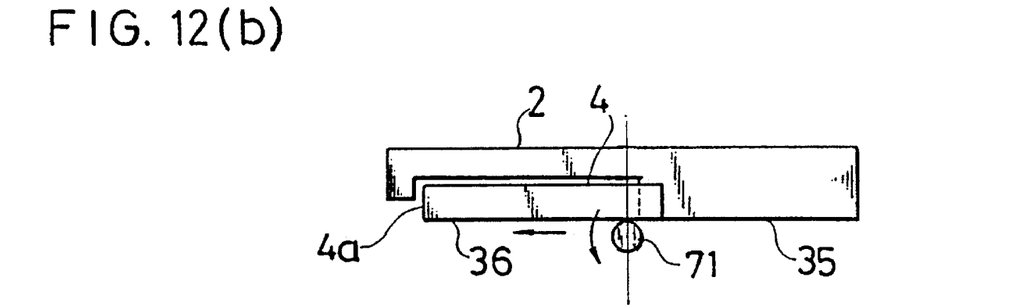
Figure 12C:
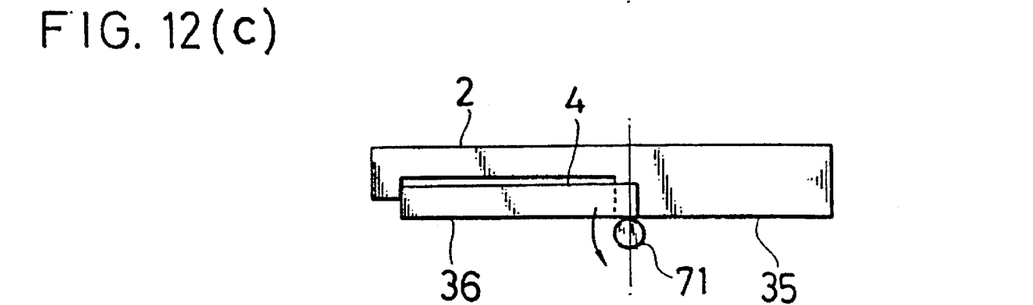
Figure 12D:
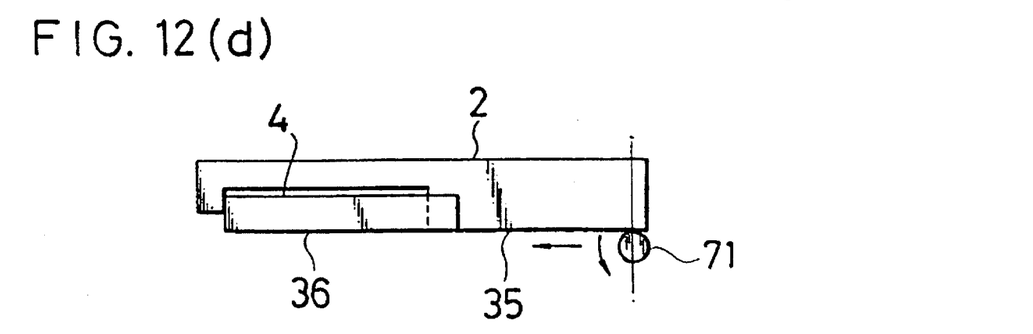

Upward and downward drive of the disc holder 3 and the reproduction unit 30 is performed by a first motor 60 as depicted in FIGS. 4 and 11. All gears are indicated merely by circles for the sake of simplification and their meshing positions are indicated by dots. It is to be noted that FIG. 11 schematically illustrates meshing relationships of the gears.

As is illustrated in FIGS. 4 and 11, a clutch gear 61 composed of an integrated large/small gear is arranged movably up and down. The large gear is normally maintained in meshing engagement with a motor gear 62 which is secured on a rotary shaft of the first motor 60 and has axially long teeth. The small gear, on the other hand, is arranged in such a way that the small gear is alternatively engageable with a reduction gear train of a drive system on the side of the disc holder 3 when the clutch gear 61 assumes an upper position or with a reduction gear train of a drive system on the reproduction unit 30 when the clutch gear 61 assumes a lower position.

The reduction gear train of the drive system on the side of the disc holder 3 is formed in combination of two integrated large/small gears 63,64. The small gear of the clutch gear 61 is selectively brought into meshing engagement with the large gear of the first-stage, integrated large/small gear 63, while the rim gear 16 of one of the rotating cams 14 is always maintained in meshing engagement with the small gear of the second-stage, integrated large/small gear 64.

The reduction gear train of the drive system on the side of the reproduction unit 30, on the other hand, is formed in combination of a single, integrated large/small gear 65. The small gear of the clutch gear 61 is selectively brought into meshing engagement with the large gear of the integrated large/small gear 65, while the rim gear 46 of the unit lifting cam 44 is always maintained in meshing engagement with the small gear of the integrated large/small gear 65.

Owing to the provision of a spring 72, the clutch gear 61 is normally located at a lower position indicated by two-dot chain lines in FIG. 11 so that the small gear of the clutch gear 61 is brought into meshing engagement with the large gear of the drive system on the side of the reproduction unit 30. Upon energization of the plunger 66, the clutch gear 61 is caused to ascend to the position indicated by solid lines so that the small gear of the clutch gear 61 is brought into meshing engagement with the large gear of the integrated large/small gear 65 of the drive system on the side of the disc holder 3.

On the other hand, horizontal advancing and retreating drive of the slider 4 and the disc receiver is performed by a second motor 67 shown in FIG. 4.

Namely, as is illustrated in FIG. 4, rotation of the second motor 67 is transmitted to a large gear 70 via a motor gear 68 and an integrated large/small gear 69, successively, and is then transmitted at a reduced speed to a pinion 71 formed integrally with the large gear 70. The rack teeth 36 of the slider 4 or the rack teeth 35 of the disc receiver 2 are selectively brought into meshing engagement with the pinion 71.

FIG. 12 schematically illustrates meshing relationships between the pinion 71 and the rack teeth 35,36. The rack teeth 36 of the slider 4 normally reciprocates in a horizontal direction between its position shown in FIG. 12(*a*) and that depicted in FIG. 12(*b*) as the motor 67 rotates in normal and reverse directions. FIG. 12(*a*) illustrates the slider 4 before it feeds out the disc D of the disc holder 3, while FIG. 12(*b*) shows the slider 4 after it has fed out the disc D of the disc holder 3 to the mount 2*a* of the disc receiver 2. In FIG. 12(*b*), the disc receiver 2 is the predetermined disc reproducing position and the rack teeth 35 of the disc receiver 2 are out of meshing engagement with the pinion 71.

As the pinion 71 further rotates counterclockwise excessively from the position shown in FIG. 12(*b*), the slider 4 excessively moves leftwards. Upon this leftward movement, a part of the disc receiver 2, namely, the wall of the recess 2*k* is pushed by the unloading tab 4*a* of the slider 4 so that the rack teeth 35 of the disc receiver 2 are brought into meshing engagement with the pinion 71 as illustrated in FIG. 12(*c*). As the pinion 71 rotates counterclockwise, the disc receiver 2 moves further leftwards to assume the position shown in FIG. 12(*d*). The slider 4 also moves together with the disc receiver 2 while being carried by the disc receiver 2.

When the second motor 67 is reversed and rotates clockwise at the position shown in FIG. 12(*d*), the disc receiver 2 moves rightwards. At this time, an inner wall of the recess 2*k* of the disc receiver 2 pushes the unloading tab 4*a* of the slider 4 in the opposite direction so that the slider 2 assumes the position shown in FIG. 12(*b*) via the position depicted in FIG. 12(*c*).

According to the disc player constructed as described above, pulling of the disc receiver 2 in the outward direction as shown in FIG. 12(*d*) facilitates mounting of a 12-cm or 8-cm disc on the mount 2*a* without interference with the clamp 40. At this time, the 12-cm disc is supported at lower peripheral edge portions thereof on the liftup fingers 38*a*, 38*b* so that a slight gap is present between an information recorded side, that is, the lower side of the disc and the upper side of the mount 2*a* to protect the information recorded side.

When an 8-cm disc is mounted, the lower side, namely, the information recorded side of the disc is protected because the bottom wall of the circular cavity 2*e* is formed slightly higher only along the peripheral edge thereof.

After the disc has been mounted, the disc receiver 2 is returned to the disc reproducing position shown in FIG. 12(*c*). Provision of a resilient holding mechanism (not shown) for resiliently holding the disc receiver 2 at the disc reproducing position can eliminate the potential problem that the disc receiver 2 could be caused to move upon movement of the slider 4.

When a reproducing operation is performed with the disc receiver 2 maintained at the disc reproducing position, the first motor 60 rotates in one direction so that the reproduction unit 30 is caused to ascend. The disc is held between the turntable 31 and the clamp 40 and, by rotation of the turntable 31, is rotated. The information recorded on the disc is then reproduced by the optical head 32 to move in parallel with the information recorded side of the disc.

When a stop operation is performed, the first motor 60 rotates in the opposite direction so that the reproduction unit 30 is caused to descend. As a consequence, the disc is again mounted on the mount 2*a*.

When it is next desired to replace the disc on the mount 2*a* by another 12-cm disc in the disc holder 3 for the reproduction of the information of the latter disc, the rack on which the desired disc is stored is designated and a disc replacement operation is performed.

Where the disc mounted on the mount 2*a* is a 12-cm disc at this time, the unit lifting cam 44 is rotated by the first motor 60 so that, as illustrated in FIG. 10(*b*), the opposite end of the intermediate lever 53 falls in the recess 47 and the pressing portions 51,51 of the positioning member 50 are caused to descend to a level below the upper side of the mount 2*a*. The slider 4 is then driven by the second motor 67 to the side of the disc holder 3, whereby the disc on the mount 2*a* is pushed at the outer periphery thereof by the unloading tab 4*a* and, while being maintained in contact with the disc guides 6,8, is transported onto the rack 7 at the predetermined height in the disc holder 3.

The second motor 67 may be designed not to rotate when the disc mounted on the mount 2*a* is an 8-cm disc or another disc is present on the rack 7 at the predetermined height in the disc holder 3. This can be achieved, for example, by detecting it with a sensor or the like. This design makes it possible to obviate the potential problem that the 8-cm disc becomes no longer removable or insertion of an additional disc onto a rack where a disc has already been stored may be attempted and the discs are hence damaged.

When the slider 4 has moved to the end position on the side of the disc holder 3, the liftup fingers 38*a*,38*b* are brought into contact with the corresponding lugs 39*a*,39*b* as illustrated in FIG. 5(*b*) and are pulled to the side of the lower side of the top plate 37. The liftup fingers 38*a*,38*b* are hence retreated away from the 12-cm disc D and the disc holder 3 is then moved upwardly or downwardly by the first motor 60. As a consequence, the desired rack 7 is positioned at the predetermined height. The slider 3 is next moved toward the disc receiver 2 by the second motor 67. At the initial stage of this movement, the liftup fingers 38*a*,38*b* are released from the corresponding lugs 39*a*,39*b* and slightly lift the 12-cm disc D from the rack 7. In this state, the disc D is pushed by the loading tab 4*b* of the slider 4 and is transported to a position adjacent to the appropriate position on the mount 2*a*.

The unit lifting cam 44 is then driven again by the first motor 60, so that the opposite end of the intermediate lever 53 is caused to move out of the recess 47 and the positioning member 50 is hence pivoted. The inclined pressing surfaces formed at the respective pressing portions 51 of the positioning member 50, therefore, push the outer periphery of the disc D, whereby the disc D is positioned substantially at the predetermined reproducing position which is slightly apart from the appropriate position.

When a reproducing operation is performed in this state, the reproduction unit 30 ascends and the turntable 31 enters the central hole of the disc. While accurately positioning the disc at the appropriate position by a tapered top surface of the turntable 31, the turntable 31 lifts the disc so that the disc is separated from the inclined pressing portions 51,51 and the liftup fingers 38a,38b. The disc is then held between the turntable 31 and the clamp 40 and is rotated. By the optical head 32, the information of the disc D is reproduced.

According to the construction described above, each disc can be held directly in the disc holder 3 without the need for use of a tray. The disc player according to the present invention can have a reduced vertical dimension compared with conventional disc players which use trays, and the disc holder 3 is required to move over a smaller vertical distance for the selection of a disc. As a consequence, the disc holder 3 can be reduced in size and weight and the lifting mechanism for the disc holder 3 can be simplified. In addition, each disc is transported between the corresponding rack of the disc holder 3 and the disc receiver 2 by directly pushing the disc at the outer periphery thereof. This makes it possible to transport the disc by an extremely small force, resulting in such an advantage that the disc transportation mechanism can be simplified.

It is to be noted that the present invention is not limited to or by the embodiment described above. For example, the clamp is arranged above the disc reproducing position in the above-described embodiment so that insertion and removal of each disc are effected by pulling out the disc receiver 2 to the side of a user. Insertion and removal of each 12-cm or 8-cm disc can however be conducted at the disc reproducing position without the need for pulling out the disc receiver 2 to the side of the user provided that the clamp is normally retreated from a position above the disc reproducing position and, only in a setting operation of a reproduction mode, the clamp is moved to the position above the disc reproducing position, for example, in association with upward movement of the reproduction unit.

Since it is no longer necessary to move the disc receiver in the modification described above, the disc receiver 2 can be fixed on the main chassis 1. The addition of a clamp moving mechanism makes it possible to omit the mechanism for moving the disc 2, so that the overall disc player can be simplified further.

In the embodiment described above, the disc guides 6,8 adapted to linearly guide each disc between the disc receiver 2 and the disc holder 3 are provided as separate members, one on the side of the disc receiver and the other on the side of the disc holder. The entire disc guide can be formed only by the disc-receiving-side guide, for example, provided that the disc-receiving-side guide formed on the disc receiver 2 is extended to the interior of the disc holder 3 and is designed movable sidewards upon upward or downward movement of the disc holder 3 to avoid interference with the disc holder 3.

The stopper plate 23 for preventing each disc from slipping out of the disc holder 3 can be omitted provided that the disc holder 3 is formed with the intervals between the adjacent racks set somewhat narrower at rear ends thereof so that each disc is gently held at an edge portion thereof by its upper and lower racks.

The information-recorded area on the lower side of each disc can be kept out of contact with its corresponding rack 7 in the disc holder 3 provided that the upper wall of the rack is downwardly inclined from the side of the disc guide toward the side of the slider 4 and is also downwardly inclined from the side of the rear end thereof toward the side of the disc reproducing position.

Even if the position of each disc is somewhat offset from the appropriate position after the disc has been transported to the mount, the position of the disc can be adjusted to the appropriate position by the tapered top wall of the turntable. It is therefore not essential to provide the positioning member provided that the disc can be moved by the disc transportation mechanism to a point close enough to the appropriate position so that the position of the disc can be adjusted by the turntable to the appropriate position.

The unloading tab 4a and loading tab 4b are provided as unloading means and loading means in the above-described embodiment. It is however unnecessary to form the unloading means and loading means as tabs. Instead, the inner edge portion of the slider 4 can be formed into such a shape that each disc can be selectively unloaded or loaded by the inner edge portion of the slider 4.

The above-described embodiment is provided with the two liftup fingers 38a,38b. It is however not essential to use two liftup fingers. Only one liftup finger can be sufficient provided that its size, shape, location and the like are suitably determined.

Having now fully described the invention, it will be apparent to one of ordinary skill in the art that many changes and modifications can be made thereto without departing from the spirit or scope of the invention as set forth herein.

What is claimed is:

1. A disc player comprising:

(A) a disc holder for holding a plurality of substantially horizontally disposed discs one over the other at predetermined intervals therebetween in the absence of disc trays;

(B) disc reproducing means having a disc receiver for mounting a disc thereon and an optical head for reproducing information recorded on the disc;

(C) a disc selector mechanism for effecting relative vertical movement between said disc holder and said disc reproducing means to select one of the discs from said disc holder to be reproduced, said relative movement being along an imaginary line extending axially through the centers of the discs held in said disc holder;

(D) a slider mounted for reciprocal movement laterally between said disc holder and said disc receiver of said disc reproducing means for transporting said one disc between said disc holder and said disc receiver of said disc reproducing means; and (E) a disc guide to permit contact of an outer periphery of said one disc with said disc guide, thereby defining a track for said one disc upon transportation of said one disc between said disc holder and said disc receiver;

(F) said slider having a push-in portion for pushing said one disc at an outer peripheral portion thereof, said peripheral portion being located on a side opposite to said disc guide relative to the center of said one disc, said push-in portion pushing said one disc from a side of said disc reproducing means toward said disc holder, and a push-out portion for pushing said one disc at said outer peripheral portion thereof from a side of said disc holder toward said disc reproducing means, whereby said one disc can be transported together with said slider over an entire range between said disc reproducing means and said disc holder; and (G) said slider being provided with a liftup finger arranged movably so that said liftup finger can be brought into contact with said one disc or can be separated from said one disc and, upon pushing said one disc at said outer peripheral portion thereof, an outer peripheral edge portion of said one disc is slightly lifted upwards by said liftup finger.

2. A disc player according to claim 1, wherein said disc guide comprises a holder-side guide integral with said disc holder and a receiver-side guide integral with said disc receiver.

3. A disc player according to claim 2, wherein holder-side said disc guide extends in a linear form.

4. A disc player according to claim 1, wherein said disc guide extends in a linear form.

5. A disc player according to claim 1, wherein said disc holder is open from a side of the disc reproducing means to a side of the slider so that a part of each disc held inside the disc holder extends out from the disc holder through the opening.

6. A disc player according to claim 1, wherein said disc receiver is arranged so that together with the slider which is moved from a side of said disc holder to a side of said disc receiver, said disc receiver is movable pulled out of said disc player.

* * * * *